March 19, 1957
T. A. NOLAND ET AL
2,785,436
FISH CLEANING TONGS
Filed June 14, 1954
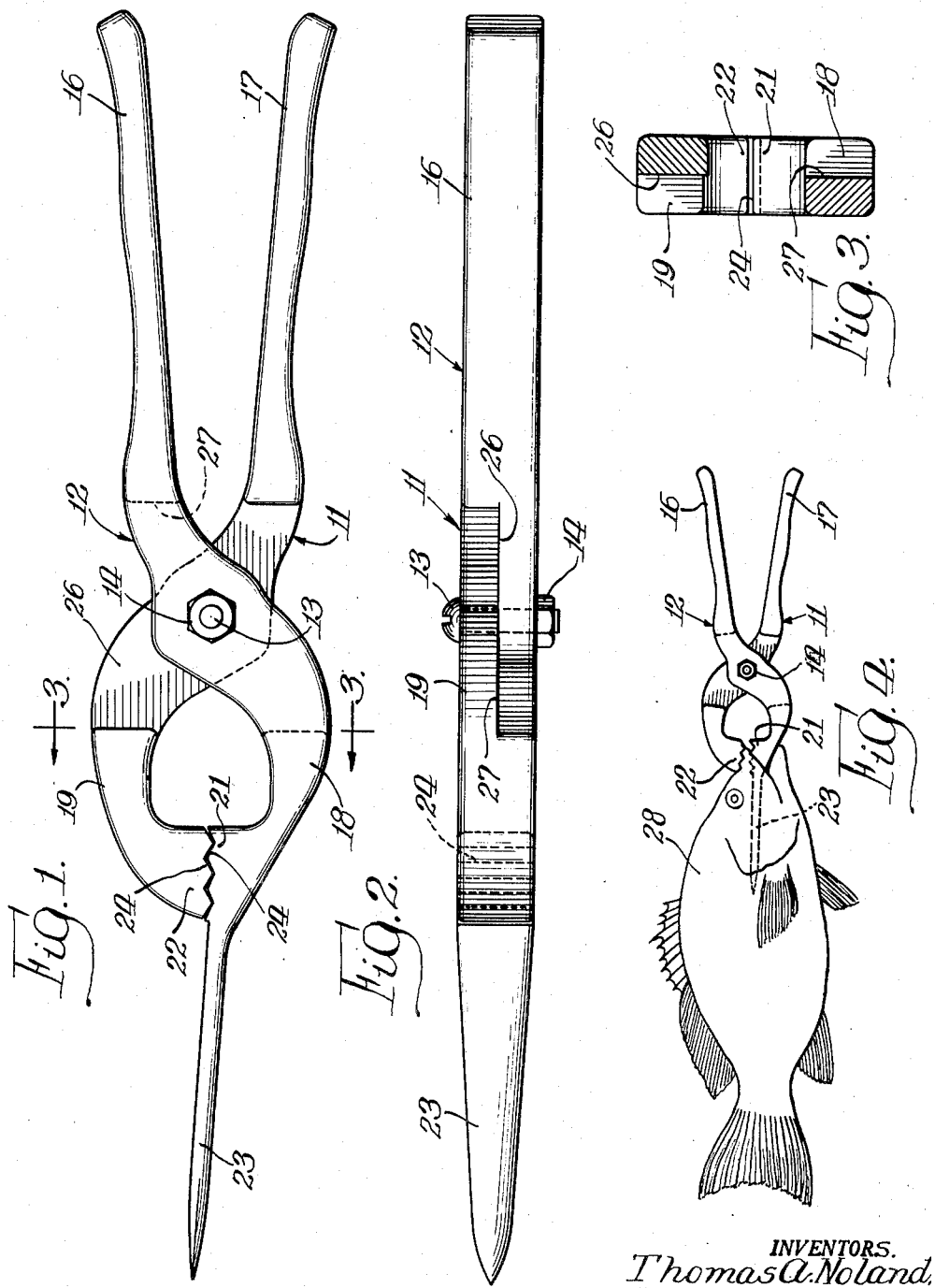
INVENTORS.
Thomas A. Noland,
Harold Norman,
Ebert M. McClintic
By Davis, Lindsey, Hibben & Noyes Atty's.

United States Patent Office 2,785,436
Patented Mar. 19, 1957

2,785,436
FISH CLEANING TONGS

Thomas A. Noland, Harold Norman, and Ebert M. McClintic, Columbus, Ind.

Application June 14, 1954, Serial No. 436,324

1 Claim. (Cl. 17—7)

This invention relates to an implement or tool for holding fish and more particularly to novel and improved tongs to facilitate the holding and handling of fish during cleaning, scaling, trimming and the like.

A primary object of the invention is to provide a novel and improved fish holding implement characterized by the provision of highly effective gripping means for securely holding the fish without tearing the same.

A further object of the invention is to provide novel and improved fish holding tongs having a structure adapted to fit over and grip the head and jaw portions of fish of various sizes and shapes.

Another object of the invention is to provide novel and improved fish holding tongs of relatively inexpensive but exceptionally sturdy construction.

Other objects and advantages of the invention will become evident from the subsequent detailed description taken in conjunction with the accompanying drawing, wherein:

Fig. 1 is a side elevational view of a preferred form of the device;

Fig. 2 is a plan view of the device shown in Fig. 1;

Fig. 3 is a transverse sectional view taken along the line 3—3 of Fig. 1; and

Fig. 4 is a small scale side elevational view illustrating the implement as applied to a fish.

Referring to the drawing, the device is in the form of a pair of tongs comprising two elongated lever members designated generally at 11 and 12 and having a pivotal connection, as by a cap screw 13 and a jam nut 14. The pivoted members 11 and 12 are each provided with cooperating handle portions 16 and 17 at one side of the pivotal connection for manipulating the implement in the manner of an ordinary pair of pliers.

On the opposite side of the pivotal connection, the members 11 and 12 are offset or curved outwardly to provide laterally spaced portions 18 and 19 and thence converge to define a pair of cooperating gripping jaws 21 and 22 each having a substantial gripping area. The member 12 also has an elongated pointed extension or prong 23 continuing integrally from the gripping jaw portion 21. Each of the coacting surfaces of the gripping jaws 21 and 22 is formed with transversely extending teeth or ribs, as at 24, which are arranged to intermesh in gripping relation as clearly seen in Fig. 1.

We have found that the foregoing construction is particularly adapted to be manufactured by casting the unitary members 11 and 12 from a light weight corrosion resistant metal such as aluminum. The resultant implement is exceptionally sturdy and durable. The pivotally connected portions of the members 11 and 12 are formed with complementary and interfitted lateral recesses 26 and 27, as best seen in Figs. 2 and 3, whereby to provide a compact and structurally strong arrangement.

In use, the prong 23 is inserted into the throat of the fish, as indicated at 28 in Fig. 4, and the notched or corrugated gripping jaws 21 and 22 are clamped securely on the upper jaw processes or head portion of the fish by squeezing of the handles 16 and 17 toward each other. Thus, the fish may be held securely while it is scaled, cleaned, or otherwise handled. At the same time the jaws 21 and 22 can readily be released and do not tend to tear or disfigure the fish. The elongated prong 23 greatly stabilizes and stiffens the fish while the coacting gripping jaws 21 and 22 provide an exceptionally rigid clamping action adjacent the base of the prong 23 by reason of the relatively large area of the jaws and the cooperating teeth or gripping ribs 24. The offset or outward curvature of the lever portions 18 and 19 provides an enlarged spaced therebetween which permits the implement to be inserted in and fitted over the head and jaws of many different types and sizes of fish so that the device has a wide field of use. In other words, the curvature of the jaw supports of the tool permits insertion of the gripping jaws to a substantial degree inside the mouth of the fish so as to provide a firm clamping action even in the case of relatively large fish.

Although we are aware of other implements of the same general character which have been suggested heretofore, the present invention has important advantages over the devices heretofore proposed by reason of the positive gripping action afforded by the coacting jaw structure 21—22—24 and also by reason of the curved construction of the levers between the pivotal connection and the gripping jaws so as to facilitate effective grasping of the jaw and head portion of the fish. Moreover, the solid sturdy cast construction of the device contributes materially to its effectiveness and ability to withstand hard usage.

Although the invention has been described with reference to a particular structural embodiment thereof, it is to be understood that various modifications and equivalent structures may be resorted to without departing from the scope of the invention as defined in the appended claim.

We claim:

A fish holding implement comprising a first elongated lever member having a handle portion at the end, an offset outwardly curved intermediate portion, and an elongated longitudinally extending prong at the other end; a second elongated lever member having a handle portion at one end and an offset outwardly curved portion at the other end; means providing a pivotal connection between said lever members adjacent the junctures of said handle portions and said curved portions; a first clamping jaw on said first lever member adjacent the juncture between the curved portion thereof and said prong; and a second clamping jaw at the outer end of the curved portion of said second lever member, said jaws being provided with opposed clamping faces having transversely extending intermeshing teeth for effectively gripping the head of a fish without piercing or tearing the same when said prong is inserted into the throat of the fish, said prong and the clamping face of said one jaw being in substantially coplanar relation and being free from lateral projections whereby said prong can readily be inserted in the throat of the fish, and said curved portions on said lever members providing an enlarged space therebetween to facilitate fitting of the jaws in gripping relation on the head of the fish.

References Cited in the file of this patent

UNITED STATES PATENTS

| 112,895 | Boyer | Mar. 21, 1871 |
| 2,015,262 | Flagg et al. | Sept. 24, 1935 |
| 2,506,227 | Lindsey | May 2, 1950 |

FOREIGN PATENTS

| 3,328 | Great Britain | 1886 |
| 17,066 | Great Britain | 1890 |
| 605,774 | Germany | Nov. 17, 1934 |